US006467464B2

United States Patent
Burke et al.

(10) Patent No.: US 6,467,464 B2
(45) Date of Patent: Oct. 22, 2002

(54) VACUUM BASED FUEL SYSTEM

(75) Inventors: David Howard Burke, Flint; Michael J. Steckler, Highland, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/733,011

(22) Filed: Dec. 8, 2000

(65) Prior Publication Data

US 2001/0029931 A1 Oct. 18, 2001

Related U.S. Application Data

(60) Provisional application No. 60/170,234, filed on Dec. 10, 1999.

(51) Int. Cl.[7] .............................................. F02M 25/08
(52) U.S. Cl. ....................................................... 123/520
(58) Field of Search ................................ 123/516, 518, 123/519, 520

(56) References Cited

U.S. PATENT DOCUMENTS

| 5,601,065 A | | 2/1997 | Tamura et al. ............... 123/516 |
| 5,636,617 A | | 6/1997 | Nakatsu ........................ 123/519 |
| 5,647,333 A | * | 7/1997 | Mukai ........................... 123/519 |
| 5,845,625 A | | 12/1998 | Kidokoro et al. ............. 123/520 |
| 5,893,353 A | * | 4/1999 | Mukai ........................... 123/520 |
| 5,906,189 A | * | 5/1999 | Mukai et al. ................. 123/519 |
| 6,269,802 B1 | * | 8/2001 | Denis et al. .................. 123/519 |
| 6,273,070 B1 | * | 8/2001 | Arnal et al. .................. 123/519 |

FOREIGN PATENT DOCUMENTS

WO 99/39094 8/1999

OTHER PUBLICATIONS

"Reduction Technologies for Evaporative Emissions in Zero Level Emissions Vehicle" Yoshio Nuiya et al, International Congress and Exposition, Detroit, Mi Mar. 1–4, 1999.

* cited by examiner

Primary Examiner—Tony M. Argenbright
(74) Attorney, Agent, or Firm—Vincent A. Cichosz

(57) ABSTRACT

A zero emissions fuel system includes a fuel tank fluidly interconnected with a fuel vapor containment and absorption canister. The canister is further interconnected with an engine intake manifold via a purge solenoid valve that controls the extent to which a vacuum in the intake manifold affects the canister. The canister is also interconnected with the ambient environment via at least one selectively operable valve. During normal operation of the engine, the purge solenoid valve allows the intake manifold to draw fuel vapor from the canister for consumption by the engine. At a predetermined vacuum pressure, the at least one valve opens, thereby allowing outside air to flow into the system through the vacuum relief valve to facilitate purging of the canister.

12 Claims, 2 Drawing Sheets

VACUUM BASED FUEL SYSTEM

This application claims priority from U.S. Provisional Patent Application Ser. No. 60/170,234, filed on Dec. 10, 1999.

FIELD OF THE INVENTION

The present invention relates generally to vehicle fuel tanks and, more particularly, to an assembly for eliminating unwanted fuel vapor emissions from vehicle fuel tanks.

BACKGROUND OF THE INVENTION

Environmental concerns and governmental regulations require reduced atmospheric emissions of volatile hydrocarbon fuel vapor. One source of hydrocarbon fuel vapor is the fuel tanks of vehicles using gasoline or other hydrocarbon fuels with high volatility. The fuel vapor can escape to the atmosphere during the filling of the tanks and usually even after the tanks are filled.

Current production motor vehicles include a fuel storage tank to hold gasoline, a pump module to send liquid fuel to the engine and measure the quantity of fuel remaining and a carbon canister to catch and hold hydrocarbon vapor that would otherwise evaporate from the fuel tank out into the environment. Typically, the canister contains activated charcoal that captures fuel vapor formed in the fuel tank through a vapor tube and valve assembly mounted in the top of the tank. The canister also communicates with the intake manifold of the vehicle engine to exhaust fuel vapor stored in the canister to the manifold for combustion during operation of the engine. The valve assembly usually has a level responsive valve that enables the valve to stay open at a sufficiently low fuel level to permit fuel vapor to flow freely from the fuel tank into the canister. During refueling, as the fuel level rises to approach a desired maximum level of fuel in the tank, a float may be raised to close the level responsive valve to prevent liquid fuel from flowing into the vapor receiving canister.

The use of such onboard vapor recovery systems to remove excess fuel vapor from the fuel tank is one solution to the environmental problem. In particular, conventional systems are capable of greatly reducing the amount of vapor released to the environment. For example, such systems may be produced from which less than 0.5 grams of vapor will escape during the U.S. EPA and California Air Resource Board 3-day test. However, emerging environmental regulations require further reductions in the amount of fuel vapor emissions.

To date, only one very complex fuel system has been able to reduce fuel vapor emissions to meet emerging zero-evaporative emissions requirements. This system, described in SAE Paper 1999-01-0771, submitted by Honda R&D Company, Ltd. and incorporated herein by reference in its entirety, proposes that a system maintained at a vacuum emits no hydrocarbon vapor. However, the system described in the SAE paper only exposes the canister to the fuel tank during refueling. As a result, the system does not provide for capture of fuel vapor at any time other than during refueling. Moreover, the existing system requires extra valves between the tank and canister that must be actuated during refueling in order to effectuate operation of the system. Such extra valves provide additional failure modes and add to the expense of the system. Thus, a zero evaporative emissions fuel system relying on a vacuum is desired that is less complex than existing systems and also provides for vapor capture, storage and removal during other than refueling operations.

SUMMARY OF THE INVENTION

A zero emissions fuel system is disclosed. The system includes a fuel tank fluidly interconnected with a fuel vapor containment and absorption canister. The canister is further interconnected with an engine intake manifold via a purge solenoid valve that controls the extent to which a vacuum in the intake manifold affects the canister. The canister is also interconnected with the ambient environment via a vacuum relief valve and a refueling vent solenoid valve.

During normal operation of the engine, the purge solenoid valve valve, controlled by an electronic control module, opens a predetermined amount in response to engine demand, thereby allowing a vacuum in the intake manifold to draw vapor from the canister for consumption by the engine. At a predetermined vacuum pressure in the canister, the vacuum relief valve is drawn open, thereby allowing outside air to flow into the system through the vacuum relief valve to facilitate purging of the canister. If the canister pressure rises above the predetermined vacuum pressure, the vacuum relief valve closes. Since the fuel tank is in fluid communication with the canister, the canister and the fuel tank are always at the same pressure.

In one embodiment, the purge solenoid valve closes when the fuel mix in the intake manifold is too rich or if the intake manifold vacuum is insufficient to maintain vacuum in the tank and canister. A pressure relief valve connected to the canister operates to vent the fuel tank and canister if positive pressure rises above a predetermined setpoint due to extreme operating conditions.

In another embodiment, the vacuum relief and the pressure relief valves may be eliminated by electronically controlling the refueling vent solenoid valve between open and closed positions in response to predetermined pressure conditions. Thus, for example, the refueling vent solenoid would open all of the way for refueling, but may be opened only a little while the vehicle is running in response to a predetermined vacuum pressure or positive pressure. A control loop may control the extent to which the vent solenoid opens and closes.

Since the canister and the fuel tank are always at the same pressure, only one pressure sensing device need be utilized. Further, the canister is continuously connected with the tank such that it may absorb fuel vapor at any time, and is not limited to only absorbing vapor during fuel filling operation. The complexity of the system is reduced by eliminating several valves and conduits, thereby further reducing the cost of the system as well.

BRIEF DESCRIPTION OF THE DRAWING

The features and advantages of this invention will be apparent from the following detailed description of the preferred embodiments and from the figures, of which the following is a brief description.

DETAILED DESCRIPTION OF PREFERRED EMBODIMENTS

Figure 1:
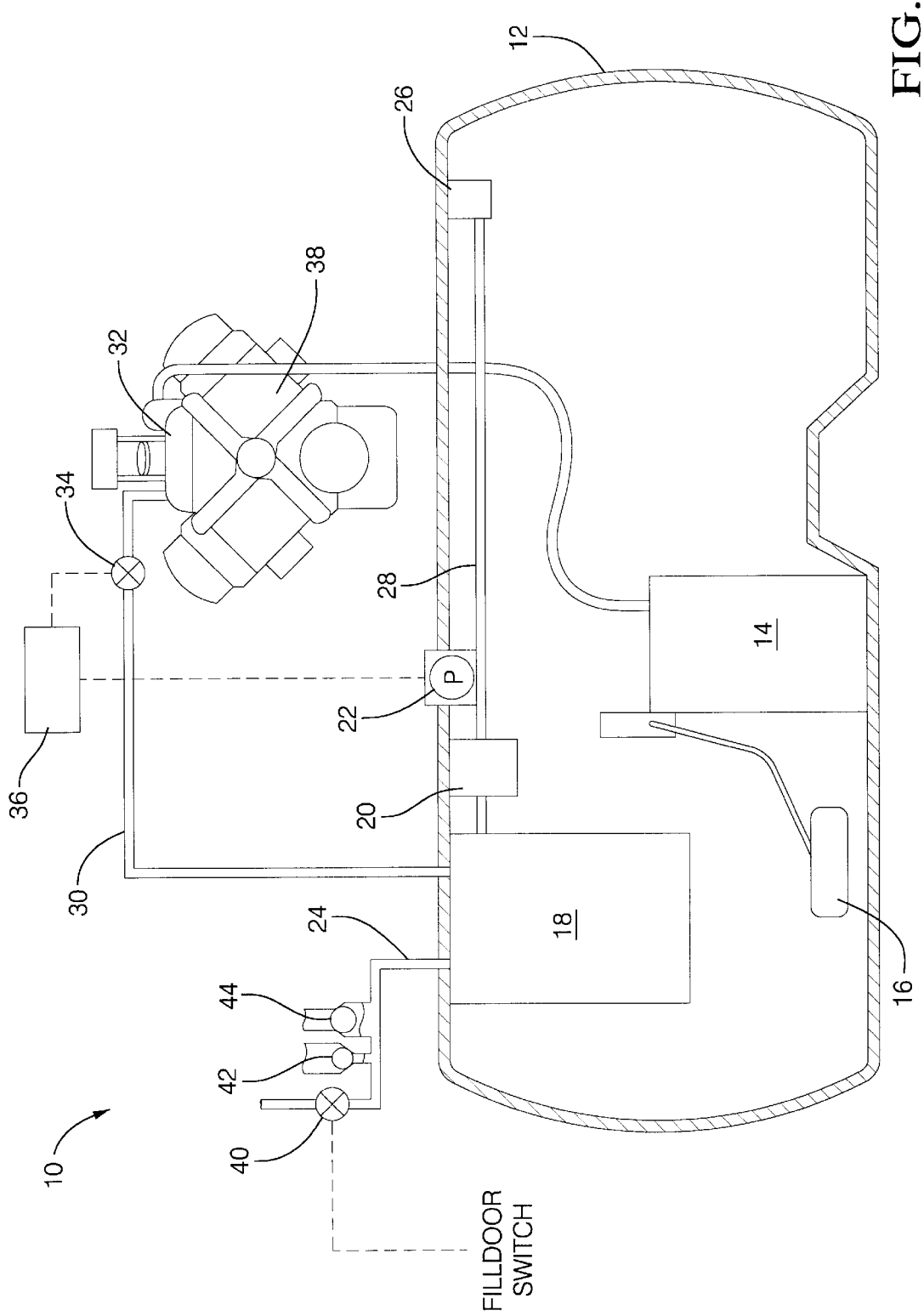
FIG. 1 is a diagrammatic view of a first embodiment of a vacuum based fuel system according to the present invention.

A zero evaporative emissions fuel system 10 relying on a vacuum from an intake manifold 32 of an engine 38 is shown diagrammatically in FIG. 1. Fuel system 10 includes a fuel tank 12 that contains a fuel pump module 14 adapted to deliver fuel to the engine 38 and a device 16, such as a float, to measure fuel quantity. Tank 12 is connected to a canister 18 that receives, contains and stores fuel vapor that evaporates from the liquid fuel contained in tank 12. As seen in FIG. 1, canister 18 may be entirely located within fuel tank 12. However, canister 18 may also be placed at a convenient location remote from fuel tank 12. For purposes of this disclosure, however, canister 18 will be described as being located within the tank 12. Additionally, tank 12, pump module 14 and canister 18 may be conventionally available parts. In particular, tank 12 may be formed of any rigid material, such as plastic. Additionally, tank 12 is preferably formed with measures to prevent permeation of fuel through the tank walls.

A vapor tube 28 fluidly connects tank 12 to canister 18. Additionally, vapor tube 28 may include a fuel fill-limiting valve 20 to prevent liquid fuel from flowing into canister 18 during refueling operations. A pressure sensor 22 is placed to sense the pressure within either the fuel tank or the canister. Since pressure within the fuel tank and canister is approximately equal, only one pressure sensor 22 is required. Pressure sensor 22 may be a relative sensor, with one side referencing outside ambient pressure (as shown in FIG. 1), or may be an absolute pressure sensor placed completely within the tank. Pressure sensor 22 may therefore be placed in any convenient location, including on the vent pipe 24 of canister 18 to sense system pressure.

Fuel tank 12 may also include a remote grade vent 26 attached to the vapor tube 28 upstream of the fuel fill limiting valve 20 and canister 18. Grade vent 26 ensures that only air and vapor are drawn into vapor tube 28 to canister 18, and not liquid fuel, at any attitude or fuel level reasonably expected.

A purge tube 30 fluidly interconnects canister 18 to an engine intake manifold 32. Flow of vapor from canister 18 to manifold 32 is controlled by a purge solenoid valve 34 that is controlled by an engine control module (ECM) 36. Intake manifold 32 is connected to engine 38 such that any fuel vapor flowing through purge tube 30 is drawn into the engine and combusted.

In a first embodiment, shown in FIG. 1, the vent pipe 24 terminates in a series of valves designed to both ensure vacuum pressure within canister 18 and to prevent extreme pressure conditions within both canister 18 and fuel tank 12. Vent pipe 24 terminates in a fuel filler vent valve 40, an over-pressure relief valve 42 and a vacuum relief valve 44. A filter may be placed on the valve inlets to keep debris from entering the system and compromising the sealing surfaces of the valves. During closed loop operating conditions, ECM 36 causes purge solenoid valve 34 to open, thereby opening purge tube 30 between canister 18 and intake manifold 32. Because vacuum conditions exist in intake manifold 32, fuel vapor is drawn from canister 18 through purge tube 30 and into intake manifold 32, from which is fed into engine 38 for combustion. Once the desired level of vacuum is reached, as indicated by pressure sensor 22, vacuum relief valve 44 is drawn open slightly, thereby allowing ambient external air to be drawn into valve 44, through vent pipe 24 and into canister 18. As long as a vacuum continues to exist in intake manifold 32 sufficient to draw vapor from canister 18 through purge tube 30, no vapor will escape through vent tube 24 and through vacuum relief valve 44.

In extreme conditions of heat and fuel volatility, the fuel within tank 12 may begin to boil. In such a case, engine 38 will consume as much fuel vapor from canister 18 in fuel tank 12 as possible based on feedback from ECM 36. However, if pressure within tank 12 and canister 18 exceeds a point at which the engine can no longer consume all fuel vapor, ECM 36 may close purge solenoid valve 34, thereby sealing canister 18. Thereafter, if pressure within canister 18 and fuel tank 12 exceeds a predetermined set point, over pressure relief valve 42 may open to relieve the pressure within canister 18 and tank 12. Similarly, when engine 38 is laboring (such as under heavy load), pressure within intake manifold 32 may exceed the pressure in tank 12 and in canister 18. In such a case, ECM 36 would also close solenoid 34 to prevent reverse flow through purge tube 30 back into canister 18. Finally, when engine 38 is not operating, all valves are closed. If pressure within canister 18 and in tank 12 undergoes a large change, either over pressure relief valve 42 or vacuum relief valve 44 will open to prevent damage to canister 18 or tank 12, or to any components within the two.

Fuel filler vent valve 40 opens only in response to an indication by the vehicle operator that refueling is about to take place. When open, fuel filler vent valve 40 allows air and vapor from within the fuel tank to flow through vapor tube 28 and into canister 18. As the combined fuel vapor and air flow through canister 18, the fuel vapor is entrained within the canister, thereby allowing only air to exhaust through vent pipe 24 to ambient. Thus, liquid fuel is allowed to displace vapor from the tank 12 during refueling operation.

Figure 2:
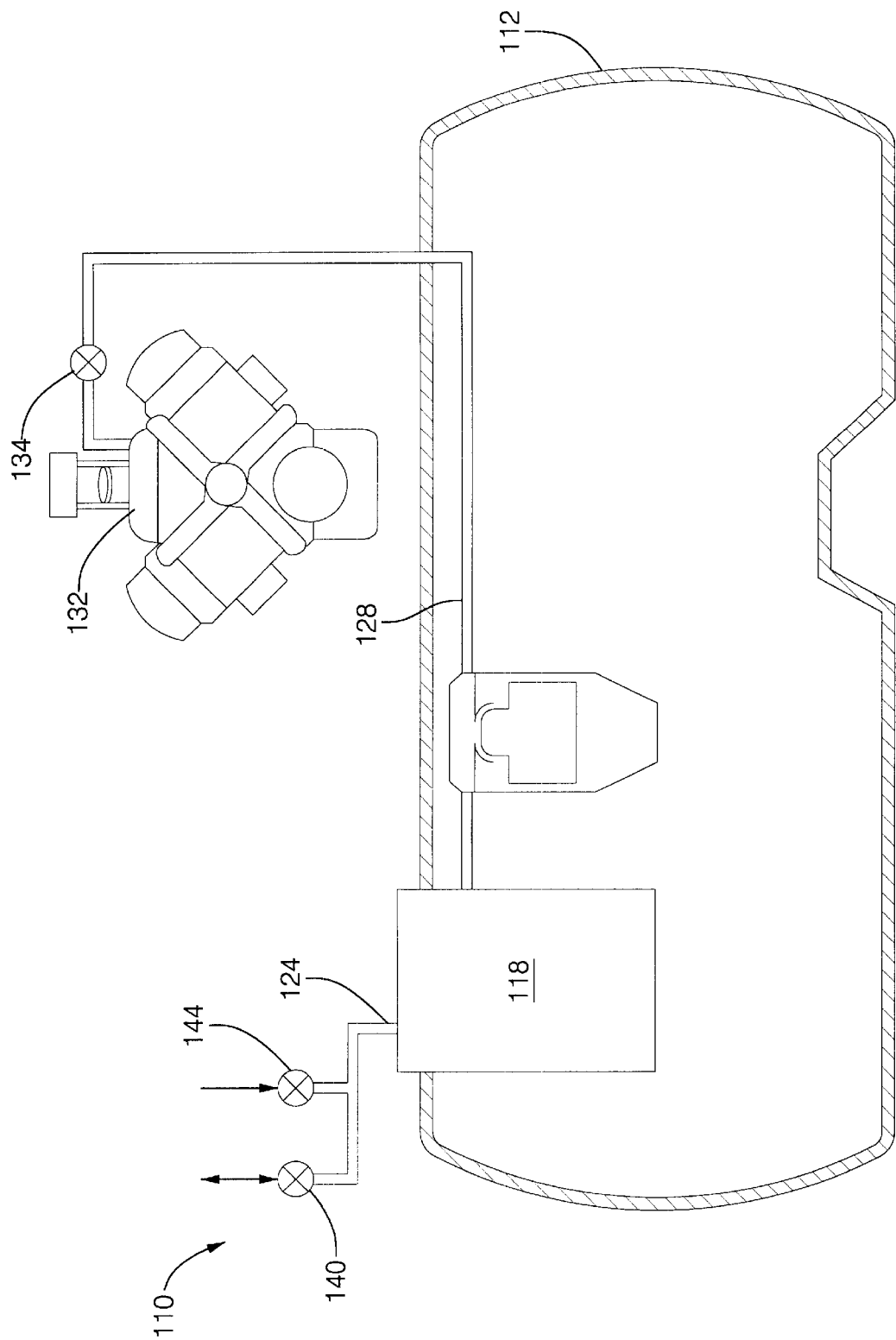
FIG. 2 is a diagrammatic view of a second embodiment of the vacuum based fuel system according to the present invention.

A second embodiment of the vacuum based fuel system 110 is shown diagrammatically in FIG. 2. A purge solenoid valve 134 connected to intake manifold 132 is controlled by an electronic control module (not shown) to meter fuel vapor from the fuel tank 112 and canister 118 through purge tube 130. In FIG. 2, a normally closed refueling vent solenoid 140 blocks ambient air from entering (or leaving) canister 118 through vent pipe 124. The refueling vent solenoid 140 is only opened to allow air to escape the fuel tank 112 as liquid fuel is received therein. In normal operation, a vacuum relief valve 144 is drawn open when the tank reaches the desired level of vacuum, in which case air flows inwardly through the relief valve 144 and vent pipe 124 to purge the canister 118. The electronic control module will close the purge solenoid valve 134 if the fuel mix in the engine is too rich, or if intake manifold 132 vacuum is insufficient to maintain vacuum in the tank 112 and canister 118. As above, if too much positive pressure builds in the tank 112 or in the canister 118 due to extreme operating conditions, the fuel filler vent valve 140 can open to relieve the pressure.

Finally, the vacuum relief valve 144 of FIG. 2 may be eliminated by electronically controlling the position of the refueling vent solenoid valve 140. Under such conditions, the refueling vent solenoid valve 140 would be opened all the way for refueling, but would only open a relatively small amount while the vehicle is running in response to over- or under-pressure conditions. The extent to which refueling vent solenoid valve 140 opens would then be continuously controlled by the electronic control module through feedback on fuel tank 112 pressure.

The present invention thus uses the vacuum of the engine to pull a vacuum on both the fuel tank and canister. Unlike previous attempts, the canister is not isolated from the fuel tank during vehicle operation. Instead, purging of the tank and canister may occur at all times during vehicle operation without allowing any environmental release of fuel vapor. Moreover, since the canister and tank are continuously held at a vacuum, purging of the canister is enhanced, and the canister contains less fuel vapor after engine operation than existing vacuum fuel systems. Also, a conventional purge solenoid valve controls canister purge so that fuel mixture at the engine is correct for clean emissions. Further, by adding a new pressure sensing device to the fuel system, vacuum within the system may be controlled by actuation of the purge solenoid valve and the ECM. A relief valve at the clean air inlet of the canister then easily controls the level of vacuum in the fuel system. Alternatively, an electrically driven valve (such as a PWM driven solenoid) can be added to the system and be driven in response to the measured system pressure. In both cases, the canister spends most of its time at a vacuum, thereby improves purgeability while still preventing fuel vapor release to the environment.

Many modifications and variations of the present invention are possible in light of the above teachings. Therefore, within the scope of the following claims, the present invention may be practiced other than as specifically described.

What is claimed is:

1. A fuel system assembly, comprising:
   a fuel tank, a vapor tube, and a fuel vapor capture canister, said fuel tank being fluidly connected to said canister through said vapor tube;
   a purge tube fluidly connecting said canister to an engine intake manifold;
   a vent tube fluidly connecting said canister to ambient air;
   a selectively operable purge valve interposed between the intake manifold and said canister on said purge tube to meter flow therethrough; and
   a series of valves on said vent tube to ensure vacuum pressure within said canister and to prevent extreme pressure conditions within both said canister and said fuel tank, said valves comprising a fuel filler vent valve, an over-pressure relief valve, and a vacuum relief valve.

2. The fuel system assembly of claim 1, further including a pressure sensing device attached to said assembly for sensing pressure within one of said tank or canister.

3. The fuel system assembly of claim 1, wherein said selective operation of said purge valve is controlled by an electronic control module.

4. The fuel system assembly of claim 1, further including a fuel fill limiting valve on said vapor tube, said fuel fill limiting valve operable to open and close said vapor tube in response to liquid fuel level.

5. A vacuum based fuel system assembly, comprising:
   a fuel tank, a vapor tube, and a fuel vapor capture canister, said fuel tank and said canister fluidly interconnected by said vapor tube such that vapor from liquid fuel in said tank may be captured and stored in said canister;
   a purge tube fluidly connecting said canister to an engine intake manifold;
   a selectively operable purge valve on said purge tube to meter flow of vapor from said canister to the manifold; and
   a vent pipe fluidly interconnecting said canister to ambient air, said vent pipe including a series of valves to ensure vacuum pressure within said canister and to prevent extreme pressure conditions within both said canister and said fuel tank, said valves comprising a fuel filler vent valve, an over-pressure relief valve, and a vacuum relief valve.

6. The vacuum based fuel system assembly of claim 5, further including a pressure sensor positioned to detect pressure within either said tank or said canister, wherein said over-pressure relief valve opens in response to pressure within said tank or within said canister.

7. The vacuum based fuel system assembly of claim 6, wherein said fuel filler vent valve opens in response to a refueling signal to allow air to flow from said canister out of said vent pipe to ambient air as liquid fuel displaces air within said tank.

8. A vacuum based fuel system assembly, comprising:
   a fuel tank, a vapor tube, and a fuel vapor capture canister, said fuel tank and said canister fluidly interconnected by said vapor tube such that vapor from liquid fuel in said tank may be captured and stored in said canister;
   a purge tube fluidly connecting said canister to an engine intake manifold;
   a selectively operable purge valve on said purge tube to meter flow of vapor from said canister to the manifold, operation of said purge valve controlled by an electronic control module;
   a vent pipe fluidly interconnecting said canister to ambient air, said vent pipe including a series of valves to ensure vacuum pressure within said canister and to prevent extreme pressure conditions within both said canister and said fuel tank, said valves comprising a fuel filler vent valve, an over-pressure relief valve, and a vacuum relief valve; and
   said vacuum relief valve selectively operable in response to predetermined conditions to allow ambient air to flow through said vent pipe to said canister.

9. The vacuum based fuel system assembly of claim 8, further including a pressure sensing device attached to said assembly for sensing pressure within one of said tank or canister.

10. The vacuum based fuel system assembly of claim 9, wherein said purge valve is selectively operable in response to said pressure sensing device.

11. The vacuum based fuel system assembly of claim 9, wherein said tank and said canister are at approximately the same pressure.

12. A fuel system assembly, comprising:
   a fuel tank, a vapor tube, and a fuel vapor capture canister disposed within said fuel tank, said fuel tank being fluidly connected to said fuel vapor capture canister through said vapor tube;
   a purge tube fluidly connecting said canister to an engine intake manifold;
   a vent tube fluidly connecting said canister to ambient air;
   a selectively operable purge valve interposed between the intake manifold and said canister on said purge tube to meter flow therethrough; and
   a series of valves on said vent tube to ensure vacuum pressure within said canister and to prevent extreme pressure conditions within both said canister and said fuel tank, said valves comprising a fuel filler vent valve, an over-pressure relief valve, and a vacuum relief valve.

* * * * *